(12) United States Patent
Streichsbier et al.

(10) Patent No.: US 7,117,079 B2
(45) Date of Patent: Oct. 3, 2006

(54) APPARATUS AND METHOD FOR SIMULTANEOUS MONITORING, LOGGING, AND CONTROLLING OF AN INDUSTRIAL PROCESS

(75) Inventors: Michael Streichsbier, El Cerrito, CA (US); Marc D. Rumminger, Berkeley, CA (US); Bradley L. Edgar, Oakland, CA (US); Albert O. Ricord, San Leandro, CA (US)

(73) Assignee: Cleaire Advanced Emission Controls, LLC, San Leandro, CA (US)

( * ) Notice: Subject to any disclaimer, the term of this patent is extended or adjusted under 35 U.S.C. 154(b) by 0 days.

(21) Appl. No.: 10/361,485

(22) Filed: Feb. 5, 2003

(65) Prior Publication Data

US 2003/0200022 A1    Oct. 23, 2003

Related U.S. Application Data

(60) Provisional application No. 60/354,669, filed on Feb. 5, 2002.

(51) Int. Cl.
*F01N 11/00* (2006.01)
*G05B 19/4063* (2006.01)

(52) U.S. Cl. .......................... 701/114; 700/79; 700/82

(58) Field of Classification Search ................ 701/115, 701/101, 102, 104, 108, 114; 700/79–82
See application file for complete search history.

(56) References Cited

U.S. PATENT DOCUMENTS

| | | | |
|---|---|---|---|
| 4,817,118 A | 3/1989 | Wilburn et al. | 377/26 |
| 5,255,208 A | 10/1993 | Thakore et al. | 364/551.01 |
| 5,353,238 A | 10/1994 | Neef et al. | 364/551.01 |
| 5,373,733 A | 12/1994 | Fuchs et al. | 73/118.1 |
| 5,564,285 A | 10/1996 | Jurewicz et al. | 62/127 |
| 5,623,416 A | 4/1997 | Hocker, III | 364/483 |
| 5,938,716 A * | 8/1999 | Shutty et al. | 701/115 |
| 5,948,026 A * | 9/1999 | Beemer et al. | 701/35 |
| 6,112,152 A * | 8/2000 | Tuttle | 701/115 |
| 6,138,078 A | 10/2000 | Canada et al. | 702/44 |

(Continued)

FOREIGN PATENT DOCUMENTS

DE    3609428    9/1987

(Continued)

OTHER PUBLICATIONS

"CRT® (Continuously Regenerating Technology) Filter," Johnson Matthey Catalytic Systems Division (2001).

(Continued)

*Primary Examiner*—Andrew M. Dolinar
*Assistant Examiner*—Johnny H. Hoang
(74) *Attorney, Agent, or Firm*—Heller Ehrman LLP

(57) ABSTRACT

An apparatus performs simultaneous data monitoring, logging, and controlling of the state of a system. The apparatus includes at least one system sensor that provides a sensor data signal corresponding to a system characteristic of which the sensor is detecting, a memory that stores data and program instructions, at least one output port that provides an output signal to the system, and a microprocessor that receives the sensor data signal and executes the program instructions to monitor and log data corresponding to the data signal received from the system sensor and to provide system control data to the output port.

17 Claims, 14 Drawing Sheets

U.S. PATENT DOCUMENTS

| | | | |
|---|---|---|---|
| 6,142,298 A | 11/2000 | Wu | 206/305 |
| 6,144,717 A | 11/2000 | Rodrigues | 377/24.1 |
| 6,234,176 B1 | 5/2001 | Domae et al. | 128/897 |
| 6,278,913 B1 * | 8/2001 | Jiang | 701/3 |
| 6,338,018 B1 * | 1/2002 | Baker | 701/104 |
| 6,347,276 B1 * | 2/2002 | Avery, Jr. | 701/112 |
| 6,393,346 B1 | 5/2002 | Keith et al. | 701/35 |
| 6,560,528 B1 * | 5/2003 | Gitlin et al. | 701/115 |
| 6,629,033 B1 * | 9/2003 | Preston et al. | 701/70 |
| 6,757,607 B1 * | 6/2004 | Rendahl et al. | 701/115 |
| 2001/0041954 A1 | 11/2001 | Maki et al. | 701/29 |
| 2002/0010562 A1 | 1/2002 | Schleiss et al. | 702/183 |

FOREIGN PATENT DOCUMENTS

| | | |
|---|---|---|
| DE | 4038972 | 11/1991 |

OTHER PUBLICATIONS

"Johnson Matthey's CRT® Particulate Filter Now Verified by CARB for all 1994 and Newer HDD Engines," (2002).

"Johnson Matthey CRT Diesel Particulate Filter Reduces Emissions by 90%," Johnson Matthey Catalytic Systems Division , (2001).

"Johnson Matthey—SCRT™ System the Combination of SCR and CRT® Filter Technologies," Johnson Matthey Catalytic Systems Division, (2001).

"LabVIEW™ Statistical Process Control Tools Revision C," National Instruments User Guide, pp. 1-29, Jun. 1999.

"National Instruments Introduces Powerful New Data Logging Tool," National Instruments News Release Jun. 26, 2001.

Derwent #007274945, WPI Acc No. 1987-271952/198739 for German Patent Application No. DE 3609428 (item I), "Self-monitoring method for vehicle functions—executing block interrogation of fault data memory always starting at location immediately following flagged location,".

Derwent #008822695, WPI Acc No. 008822695, for German Patent Application No. DE 4038972 (item J), "Service times calculator for motor vehicle—has indicating computer supplied with working values e.g. number of starts, crankshaft revolutions, engine temp. and fuel consumption,".

* cited by examiner

APPARATUS AND METHOD FOR SIMULTANEOUS MONITORING, LOGGING, AND CONTROLLING OF AN INDUSTRIAL PROCESS

REFERENCE TO PRIORITY DOCUMENT

This application claims the benefit of priority of co-pending U.S. Provisional Patent Application Ser. No. 60/354,669 entitled "Apparatus and Method for Simultaneous Monitoring, Logging, and Controlling of an Industrial Process", by M. Streichsbier et al., filed Feb. 5, 2002. Priority of the filing date of Feb. 5, 2002 is hereby claimed, and the disclosure of the Provisional Patent Application is hereby incorporated by reference.

BACKGROUND OF THE INVENTION

1. Field of the Invention

The present invention relates to devices for controlling and monitoring processes. In particular, the devices may be used for the process control and monitoring of engine exhaust treatment systems.

2. Description of the Related Art

An internal combustion engine generates exhaust gases that includes components that are regarded as pollutants, such as carbon monoxide (CO) and oxides of nitrogen (NOx). Many engines are fitted with an exhaust treatment system to reduce the exhaust gas pollutants emitted by the engine. Exhaust treatment systems that are retrofitted to an in-use engine can be passive or active in nature. Typically, passive exhaust treatment systems are simply connected to the engine exhaust stream and cannot respond to unusual conditions outside of their design parameters.

An example of a passive system is a diesel particulate filter (DPF) such as the "CRT" (Continuously Regenerating Trap) particulate filter product available from Johnson Matthey of Malvern, Pa., USA. A DPF places a filter in the path of the exhaust stream to trap pollutants that would otherwise be released as part of the exhaust. These types of exhaust treatment systems typically require periodic maintenance and in some instances might require immediate attention to maintain proper operation (i.e., effective exhaust treatment). Therefore, it is necessary to continuously monitor the engine exhaust gas components during engine operation. An active system, for example, a DPF with exhaust brake, a DPF with reagent injection, or a lean NOx catalyst with reductant reagent injection, requires a controller for proper function.

The Johnson Matthey company provides a "CRTdm" (CRT Filter diagnostic module) product, a monitoring apparatus for particulate filters. The "CRTdm" has two inputs (a thermocouple and an analog voltage), four LED outputs, and includes a data logging capability. The "CRTdm" apparatus, however, does not allow control of an injector or valve.

In addition to system monitoring, it is also important to record engine operating conditions for future analysis and to provide information for troubleshooting malfunctions. For example, if a DPF is approved for application on a vehicle with a duty cycle that results in high exhaust temperature, but the vehicle is operated under a duty cycle with significantly colder exhaust temperature, a record of the engine operating conditions, such as a data log, would document the out-of-specification operating conditions. In addition, the data log may be used to document the regularity of scheduled maintenance.

National Instruments Corporation of Austin, Tex., USA has a line of data acquisition and control systems that is generally flexible and programmable (viewable on the Internet "World Wide Web" at the URL of www.ni.com). The systems, however, tend to be relatively expensive, complex, and generally require a personal computer to operate. For example, National Instruments Corporation provides a "LabVIEW" software product that supports development of measurement and control applications using a graphical user interface. The software runs on a personal computer and contains various modules for data collection, instrument input/output, and data processing. One of the modules provides a histogram tool, as described in "LabVIEW Statistical Process Control Tools" User Guide, document 322042A-01.

U.S. Pat. No. 5,373,733 to Fuchs et al. entitled "Exhaust filter backpressure indicator", indicated as assigned to Donaldson Company, Inc. of Minneapolis, Minn., USA, describes an exhaust filter backpressure indicator that includes a sensor for measuring the backpressure and the exhaust system. The sensor sends a signal that is processed for indicating that an exhaust filter element is filled. The indicator operates according to engine operating speeds (RPM) and according to exhaust back pressure. There is no description of any data logging function.

U.S. Pat. No. 6,234,176 to Domac et al. entitled "Data logger for transportable life support system", indicated as assigned to Integrated Medical Systems, Inc., of Greenwich, Conn., USA, describes a technique for logging information representative of the operation of medical devices, such as those of a transportable life support system. The technique includes isolation circuitry designed to mitigate electronic interference with the medical devices.

U.S. Pat. No. 5,564,285 to Jurewicz et al. entitled "Method of converting a time based data logger to a time and random event based data logger" is indicated as assigned to Thermo King Corporation of Minneapolis, Minn., USA. The Jurewicz patent describes a method of processing data logger inputs to allow both asynchronous logging of data (i.e., event-based data such as equipment malfunction) and also synchronous logging of data (i.e., time-series data stored at predetermined constant time intervals).

U.S. Pat. No. 5,623,416 to Hocker entitled "Contact closure data logger", indicated as assigned to Onset Computer Corporation of Pocasset, Mass., USA, describes a contact closure data logger that monitors state changes in a main switch, and records the time at which the state changes occur. Operational features to conserve power are included. The logger is described in the context of energy usage monitoring and for use with tipping bucket rain gauges.

U.S. Pat. No. 6,144,717 to Rodrigues entitled "Wheel mounted data logger" describes a wheel mounted data logger with an odometer for mounting at a hub of a wheel of a vehicle and response to turning of the wheel, an hour meter for mounting on a structure of the vehicle and response to running of an engine of the vehicle, and microcontroller for mounting on the vehicle and receiving, recording and transmitting the responses of the odometer and hour meter. The wheel logger obtains information about operation of the vehicle to which it is mounted.

U.S. Pat. No. 4,817,118 to Wilburn et al. entitled "Mobile incident logger", indicated as assigned to Step Engineering of Sunnyvale, Calif., USA, describes a mobile incident logger for monitoring an on-board, automotive, computer and signal levels developed by analog and digital sensors, the logger employing a coverage monitor, which records which memory locations are accessed by the computer; a cycle tag counting unit, which counts bus cycles of the computer; a discriminator, which detects the occurrence of incidents the logger is to record; a trace memory unit, which stores bus states of the computer; a trace memory unit, which stores memory variables of the computer; a discriminator, which detects the occurrence of some of the incidents the logger is to record; and a trace memory unit, which stores the sensor signals.

German Patent Application No. 36 09 428 is directed to "A Method and a Device for Testing Devices of a Motor Vehicle for a Fault-Free Condition". The application discloses the detection and storing of faults, both with respect to the input and output signals, as well as to the internal signal processing of a control unit, and the outputting of the same in response to a request signal. Specifically, the memory, into which possible fault signals are written, is queried on a block by block basis in response to a request signal and, moreover, there is a ranking of the faults when they are output to the display.

German Patent Application No. 40 38 972 is directed to a "Device for Computing a Motor-Vehicle Service Interval". It provides for various operational values to be recorded, such as number of starts, crankshaft revolutions, driving and parking times, engine temperature, engine oil pressure and the like, and for the service interval to be calculated from the values by a computer.

Several commercially available data loggers are known, including the Pace Scientific Pocket Logger, the Onset Computer HOBO, Omega data loggers, and loggers from Campbell Scientific.

Another important function to be performed is that of actively controlling a process. For example, an active exhaust treatment system might include components that adjust engine operation to achieve a desired exhaust emissions characteristic or otherwise adjust system operation to be within predetermined operating parameters. Such adjustments can be initiated by an appropriately designed controller.

There are many controllers for engines and engine exhaust aftertreatment systems. Some systems involve fitment of selective catalytic reduction (SCR) systems and have controllers that monitor the engine and aftertreatment system, and also control the injection of a reducing agent. Examples of manufacturers who provide such SCR systems include HUG Engineering AG of Räterschen, Switzerland and Siemens AG of Regensburg, Germany. Such systems can be both mobile and stationary.

In addition to engine and engine exhaust treatment systems such as described generally above, other industrial processes would benefit from improved monitoring, logging, and control. Such processes can include, for example, chemical plants, fuel processing plants, and the like.

Because data logging can require a relatively large amount of data storage space, efficient data recording can be important. Commercially available data loggers and data acquisition systems typically use constant logging intervals (e.g., record the sensor values every 10 seconds until the user chooses another value). The use of a constant logging interval is highly inefficient for data logging of vehicles because there are many time periods where sensor values do not change. For example, a truck driving at a steady speed on the open highway, or a bus stopped and waiting to run to the next route repetition, will both exhibit little change in their operating conditions and sensor values.

Thus, there is a need for combinations that provide monitoring, logging, and control functions and that can be easily fitted to systems. In addition, there is a need for efficient recording of system data for such combinations. The present invention satisfies these needs.

SUMMARY

The present invention is directed toward an apparatus that can perform simultaneous data monitoring, logging, and control functions relating to a system. The apparatus includes at least one system sensor that provides a sensor data signal corresponding to a system characteristic detected by the sensor, a memory that stores data and program instructions, at least one output port that provides an output signal to the system, a timing source that provides clock timing signals, and a microprocessor that receives the sensor data signal and executes the program instructions to monitor and log data corresponding to the data signal received from the system sensor and to provide control data to the output port that thereby controls a device affecting the system, in accordance with the clock timing signals. The system sensor and other components can be easily fitted to the system for which monitoring, logging, and control are being performed. The apparatus memory stores the programming instructions and permits modification of the instructions to adjust apparatus operation and complement the system to which the apparatus is fitted. The apparatus can efficiently record the system data that is collected by the sensor using adaptive data logging and differential recording schemes, with or without controlling a device affecting the system.

The apparatus can be applied to a wide variety of systems and industrial processes. For example, the apparatus can be fitted to vehicle engine exhaust treatment systems to record exhaust gas pollution levels, adjust operation of the exhaust treatment system, and thereby provide a cleaner exhaust. The apparatus can also be fitted to industrial processes, such as chemical processing plants and power generation facilities, and other systems that are operated according to process controls and monitored conditions. The apparatus thereby provides a relatively inexpensive, compact, efficient, programmable configuration that simultaneously monitors, logs, and controls a process.

Other features and advantages of the present invention should be apparent from the following description of the preferred embodiment, which illustrates, by way of example, the principles of the invention.

DETAILED DESCRIPTION

A process monitoring, logging, and control apparatus is provided that can perform simultaneous data monitoring, logging, and controlling of the state of a system. Providing a single apparatus that simultaneously performs all three functions provides a relatively inexpensive, compact, efficient, programmable configuration for simultaneously monitoring, logging, and controlling a process. It is generally known to provide a device that performs process control, or data logging, or monitoring, but the present invention provides all three functions in an apparatus of a single design and construction, in a compact, self-contained system. Thus, it is not necessary to combine several separate devices together to obtain the functionality achieved by the present apparatus. In the embodiments described below, innovative data processing tools are provided.

Figure 1:
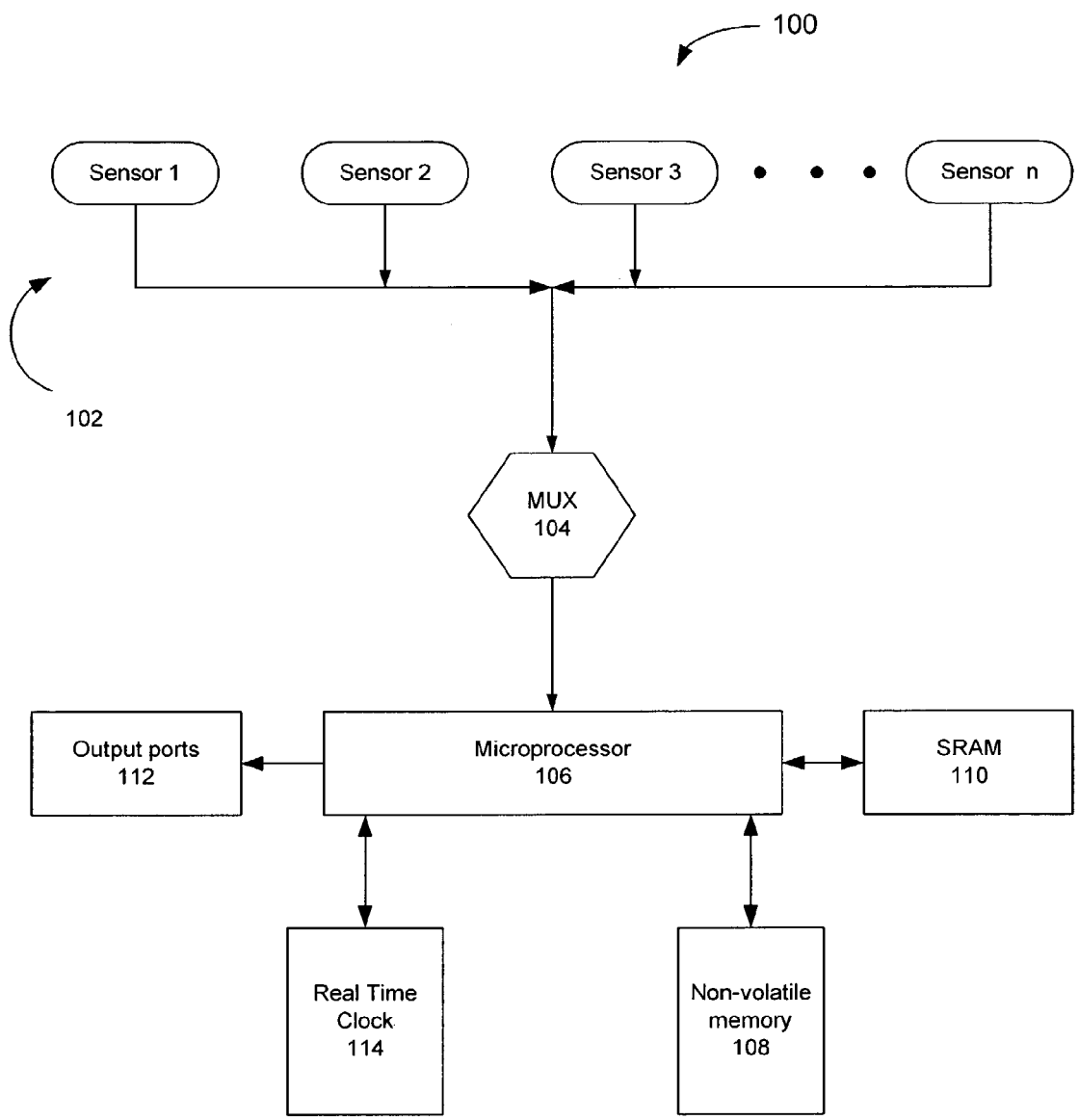
FIG. 1 is a block diagram of a system constructed in accordance with the present invention.

FIG. 1 is a block diagram of an apparatus 100 constructed in accordance with the present invention for monitoring, logging, and control of an underlying system that implements an industrial process. The industrial process system is not illustrated in FIG. 1 for simplicity of illustration. The apparatus 100 includes at least one sensor 102 that generates a data signal corresponding to a system characteristic of which the sensor is designed to detect. In FIG. 1, the apparatus is depicted with multiple sensors 102 designated Sensor 1, Sensor 2, Sensor 3, and so forth through Sensor n. Each one of the sensors generates a data signal in accordance with its corresponding system operating characteristic. The sensors 102 interface to a multiplexer (MUX) 104 that receives the corresponding data signals and provides them to a microcontroller or microprocessor 106.

The apparatus 100 also includes memory comprising, for example, non-volatile memory 108 and static random access memory (SRAM) 110 that stores data and program instructions, and also includes at least one output port 112 that supports interfacing the apparatus to one or more output devices, which can be part of the system being monitored, logged, and controlled. For example, the output port 112 can provide a control signal to an output device comprising an industrial process mechanism of the system. The microprocessor 106 can receive the data signals and can read the program instructions, causing execution of the instructions to perform data monitoring, logging, and control functions in accordance with the data signals. That is, the microprocessor can provide control data to the output port 112 to interface with the system and thereby control it. The apparatus 100 also includes a timing source 114, such as a real-time clock, that provides clock timing signals. The microprocessor 106 operates in accordance with the clock timing signals.

The microprocessor 106 and associated components 104, 106, 108, 110, 112, 114 can be advantageously packaged in a single unit, such as components mounted on a circuit board and enclosed within a housing. The microprocessor and associated components, along with the sensors 102, can be easily fitted to the system being monitored, logged, and controlled, even after the system has been placed in service. For example, it can be fitted to an engine that is operating in a vehicle or at an installed location. The non-volatile memory 108 can comprise nonvolatile memory chips of the FLASH type that can be read by the microprocessor 106 so as to operate in accordance with stored program instructions. In this way, the microprocessor is programmable for operation complementary to the system to which the apparatus is fitted. As described further below, the apparatus 100 can efficiently record the system data that is collected by the sensors 102.

As noted above, the microprocessor 106 and related components can be implemented in a circuit board and associated electrical and electronic devices. For example, in a preferred embodiment, the associated devices can include signal conditioning circuits, a microcontroller with analog-to-digital and digital-to-analog conversion circuits, non-volatile memory chips, power circuitry, and assorted output creating circuits.

Thus, the collection of components depicted in FIG. 1 can be fitted to an industrial process so as to comprise a monitoring, logging, and control apparatus in accordance with the invention. As described further below, adaptive data logging and differential recording schemes can be used with both passive systems and active systems to more efficiently monitor sensors and log sensor data. In the case of a passive system, the output port 112 can be connected to indicator lights or other status indicators.

In one embodiment, for example, where the monitoring, logging, and control apparatus is to be used with a general industrial process, the apparatus can comprise the following hardware features that are suitable for a variety of applications:

(a) Input channels and signal conditioning for frequency, thermocouples, resistance temperature detectors, or sensors that produce output data signals in a predetermined range of signal magnitude, such as 0–5 VDC;

(b) Power electronics that accept a predetermined range of input voltage signal magnitude, such as 1–240 VDC or VAC input, convert to the voltage used by the microcontroller and the sensors (typically 0–5 VDC), and regulate this voltage for efficient operation, such that this power flexibility allows the apparatus to be used in many industrial settings;

(c) Circuitry to prevent circuit damage through over-voltage input;

(d) Analog-voltage output for controlling process equipment;

(e) Digital-voltage output for controlling process equipment;

(f) One or more static random access memory (SRAM) chips;

(g) Real-time clock circuit;

(h) Circuits (and software routines) to connect to a PC, transmitting station, or handheld computer (any suitable protocol could be used, such as RS-232 or a wireless standard such as IEEE 802.11b);

(i) LED or relay driver output for feedback to the operator; and (j) Relay driver output.

In another embodiment, where the apparatus is to be part of a system for treatment of the exhaust of internal combustion engines, the following hardware features are preferably included in addition to those listed above:

(k) Power electronics that accept a predetermined range, such as 10–36 VDC (this range typically allows use on 12 VDC and 24 VDC systems);

(l) Pulse-width modulation outputs for injectors, stepper motors, or other pulse-width driven devices;

(m) Circuitry for analog inputs that are in a predetermined signal range, such as 0–5 VDC;

(n) Circuitry that can regulate and smooth a choppy and ill-behaved input waveform and that can accept input waveforms that vary from 0.5 to 30 V and can be sinusoidal, sawtooth, square wave, or a combination of the three;

(o) Circuits connecting to the Controller Area Network (CAN) of a vehicle or generator, and for handling any messaging tasks;

(p) A pressure sensor that is directly soldered to the printed circuit board and integrated into the electronic design of the apparatus; and (q) Circuitry to access global positioning information through use of an in-system global positioning system (GPS) receiver, or through electrical interface with a preexisting GPS device. Optionally, the device contains software that determines in which air quality management district (i.e., geographic location) the vehicle is operating so that emission reduction credits can be assigned to the appropriate district.

The sensors used in the apparatus can be tailored to the system for which monitoring, logging, and control are being performed. For example, for exhaust treatment systems that reduce the engine's NOx emissions and utilize an engine exhaust catalyst, the exhaust treatment system optionally includes two sensors that continuously measure the NOx concentration in the exhaust before and after the catalyst. The NOx reduction caused by the treatment system is continuously monitored and the results are stored in the apparatus memory. Thus, the actual in-use performance of the NOx control is recorded.

Figure 2:
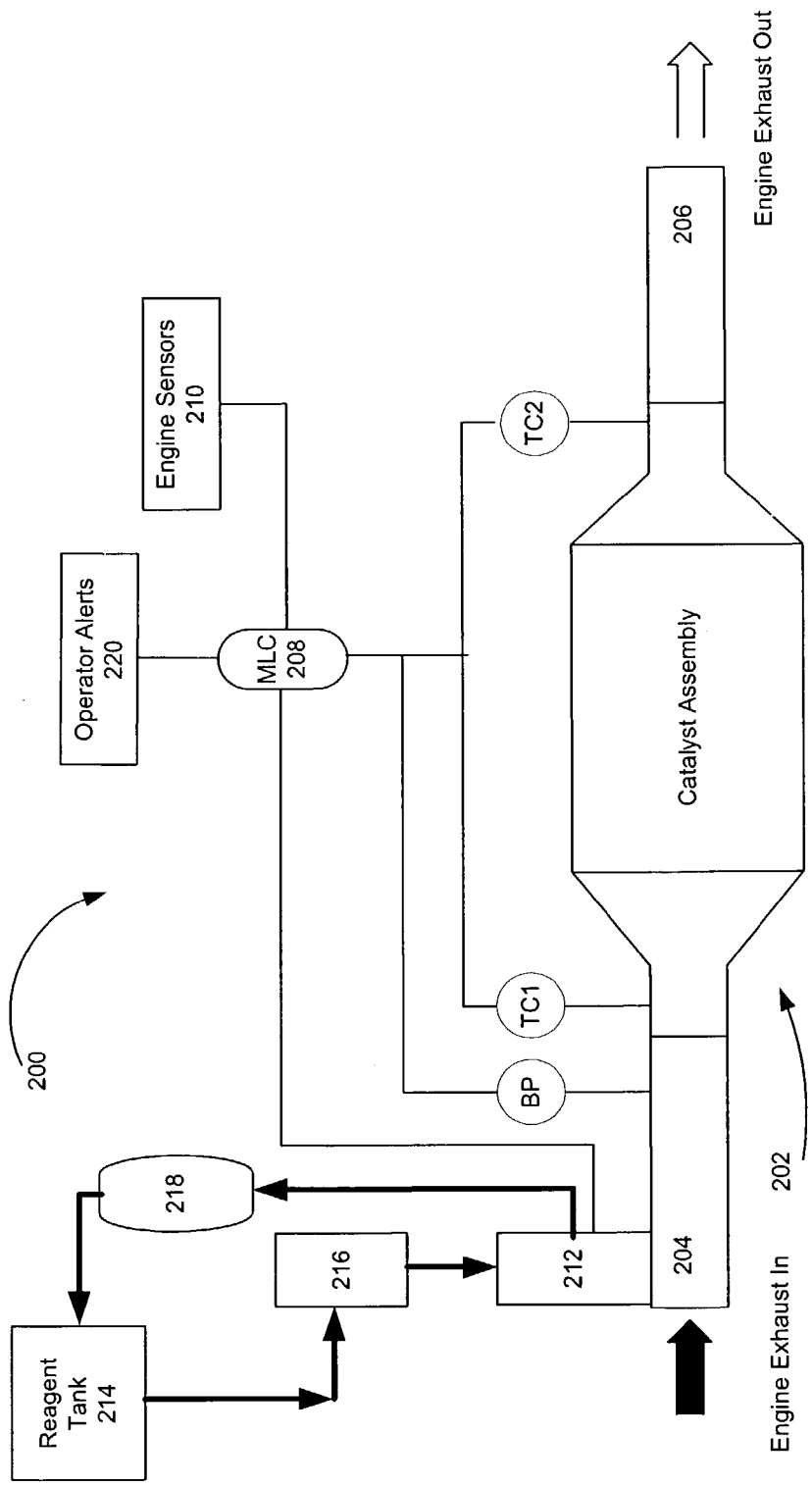
FIG. 2 is a schematic diagram of an engine exhaust treatment system that performs simultaneous data monitoring, logging, and control functions in accordance with the present invention.

FIG. 2 is a schematic diagram that shows an embodiment in which a monitoring, logging, and control apparatus 200 such as described above is fitted to an exhaust catalyst assembly 202 to comprise an exhaust treatment system of an internal combustion engine (not illustrated), such as a diesel engine. The exhaust stream of the internal combustion engine is passed through the exhaust catalyst assembly 202, which could include combinations of such technology as an NOx reduction catalyst (NRC) module, an $NO_x$ adsorber, a selective catalytic reduction catalyst, a diesel oxidation catalyst, or a diesel particulate filter (DPF) module. The engine exhaust is received at an inlet 204 of the catalyst assembly and is emitted from an outlet 206 of the catalyst. The apparatus sensors include two thermocouples that function as exhaust gas temperature sensors, one sensor TC1 at the catalyst inlet 204 and another sensor TC2 at the catalyst outlet 206. The apparatus also includes a backpressure sensor BP at or near the catalyst inlet. The temperature sensors TC1 and TC2 preferably are provided by two Type K thermocouples that are amplified and cold-junction compensated by an integrated circuit, such as an AD597 from Analog Devices Inc.

An apparatus monitoring, logging, and control (MLC) microprocessor 208 receives the data signals produced by the sensors TC1, TC2, and BP. The MLC microprocessor also can receive data signals from one or more engine sensors 210 as needed, such as sensors for engine speed, ambient temperature, throttle position, and the like. The MLC microprocessor 208 monitors the engine operating conditions via the engine sensor signals, monitors and logs the exhaust treatment operation via the signals from the apparatus sensors TC1, TC2, BP, and controls reagent addition to the exhaust gas stream. Adding reagent to the exhaust gas stream can improve the exhaust gas interaction with the catalyst assembly 202. Examples of reagents include diesel fuel, urea, ammonia, on-board generated hydrogen, and various alcohols. Therefore, the apparatus 200 adds reagent to the exhaust gas stream at the catalyst inlet 204. The MLC microprocessor illustrated in FIG. 2 includes memory for storage of the logged data and of program instructions.

The MLC microprocessor 208 determines a reagent addition rate and controls an exhaust stream reagent injector 212 at the catalyst inlet 204 to add reagent to the exhaust stream at the determined rate. The added reagent provides a reducing agent for the catalyst assembly (if appropriate), or a source of heat for the DPF. The backpressure sensor BP monitors exhaust backpressure caused by the catalyst assembly 202. If a DPF is installed, the sensor BP monitors the soot loading on the DPF and indicates when the filter requires servicing.

In the FIG. 2 system, the reagent that is added to the exhaust through the injector 212 is drawn from a reagent supply tank 214 (or directly from the engine fuel system if the reagent is the same chemical as the vehicle fuel). A pump and filter 216 (possibly as an integrated combination) pressurizes the reagent that is delivered to the injector 212. The injector is mounted downstream of the engine and upstream of the catalyst 202, such as at the catalyst inlet 204. A reagent monitoring and regulation assembly 218 includes a pressure switch, regulator check-valve, and shut-off solenoid valve that operate to monitor and regulate the flow of the added exhaust reagent.

The programming of the MLC microprocessor 208 permits it to monitor the exhaust treatment system by receiving the data signals from the TC1, TC2, BP, and engine sensors 210. The memory of the microprocessor 208 stores operating data for later review, as described further below. Lastly, the microprocessor controls the operation of the exhaust reagent injector to inject reagent at a rate that it determines. The microprocessor continuously logs the operating data, it also records any instances of unusual conditions. The unusual conditions can be identified, for example, by data signal values that are out of a predetermined range of expected values. For example, if an exhaust backpressure value from the BP sensor reaches an out-of-ordinary range, the microprocessor 208 can generate an output message and can write an appropriate data record to a portion of the microprocessor memory for later download. The data relating to the unusual condition can be written to a reserved section of memory that can only be accessed by authorized users, if data security is a concern. In this way, all data relating to an out-of-ordinary operation is preserved for later study. This feature can be especially important for service determinations under warranty, in that an engine operator cannot operate the engine in an unauthorized manner and delete the logged data that would otherwise provide a record of the unauthorized operation.

As noted above, the microprocessor 208 includes output ports that interface to output devices and indicators to provide operator alerts 220. It should be understood that one output of the microprocessor comprises the control signal from the microprocessor 208 to the exhaust reagent injector 212. In another example, the output ports might interface to indicator lights, such as light emitting diodes (LEDs) that provide red and green lights to indicate normal operation or a system fault, respectively. The LEDs can be installed in the dashboard of a motor vehicle, to readily indicate the system state to the vehicle operator.

The red and green LEDs can be controlled by the microprocessor 208 to indicate operating status. For example, the microprocessor provides a steady illuminated green LED when the apparatus power is on and operation is normal. The green LED blinks on and off when the microprocessor commands the addition of reagent to the exhaust stream. A blinking red LED could indicate that one of the sensors is either broken or disconnected. A steadily illuminated red LED could indicate that the one or more sensors has exceeded the recommended limits at least once (and perhaps additional times) since the apparatus was last reset. The steady red LED indicates that continued operation of the vehicle might result in adverse consequences to the apparatus, and the operator is advised to immediately seek servicing. To ensure proper servicing, the microprocessor functions so that a steady red LED light can only be turned off through a reset command from a service computer connection to the microprocessor.

Figure 3:
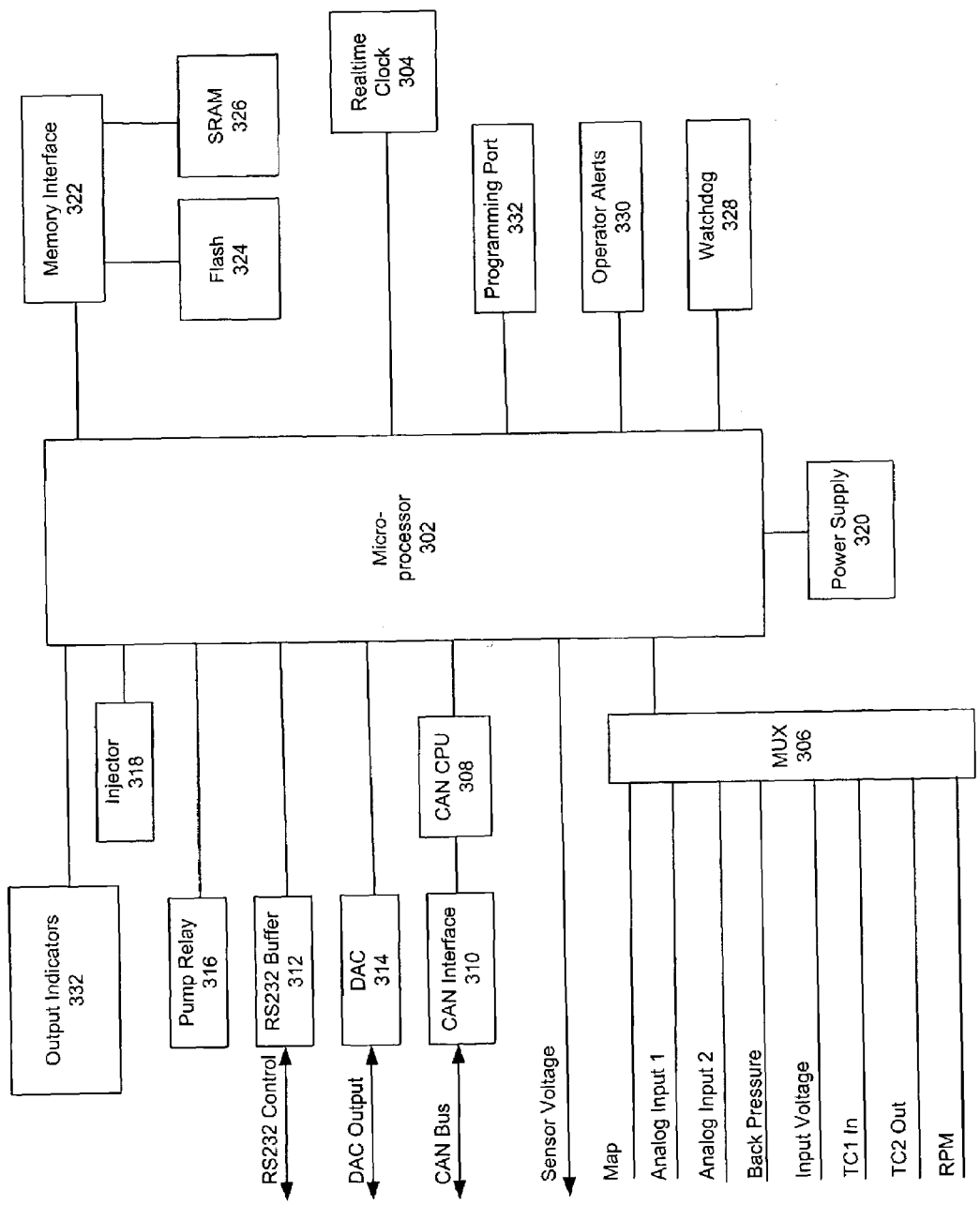
FIG. 3 is a block diagram that shows the microprocessor and associated components of the FIG. 2 apparatus.

FIG. 3 is a block diagram that shows details of the FIG. 2 apparatus. The microprocessor 302 receives clock timing signals from a real time clock 304. The microprocessor receives data signals from various sensors, such as the exhaust catalyst input sensor TC1 In and output sensor TC2 Out, and the backpressure sensor, and engine RPM. Other input data signals can comprise selected sensor voltage signals, and a variety of data signals such as an Analog Input 1, an Analog Input 2, an Input Voltage signal, and the aforementioned backpressure signal. The signals can be received over a multiplexer (MUX) line, and an additional pressure sensor signal (Map) can be received by the MUX 306 for selecting the input signal.

The microprocessor 302 also communicates with a vehicle controller area network (CAN), as illustrated by the CAN microprocessor 308 and CAN interface 310, which connects to a CAN bus. The microprocessor also interfaces to an RS232 buffer 312 for data communications and also provides a port for connection to a digital-to-analog converter (DAC) 314. The RS232 buffer permits convenient communications with a personal computer or any other computing device that is capable of communications over the well-known RS232 standard. The microprocessor also interfaces to the reagent pump 316 for the exhaust gas addition and to the exhaust reagent injector 318.

Operation of the microprocessor 302 is powered by the power supply 320. Data is stored and read from a memory interface 322 that connects the microprocessor to a flash memory chip 324 and to an SRAM chip 326. The "watchdog" block 328 of FIG. 3 refers a circuit or circuits which are used to detect software errors identified by predetermined conditions (such as an unexpected infinite loop) and to reset the system if they occur. The operator alert block 330 refers to output devices intended to alert the operator of system operation or malfunction, i.e., the red and green LEDs referred to above. The microprocessor also should include an interface to a programming port 332 such as a Joint Test Access Group (JTAG) connector in conformance with IEEE Standard 1149.1 for communication with suitably configured programming and test equipment.

Figure 4:
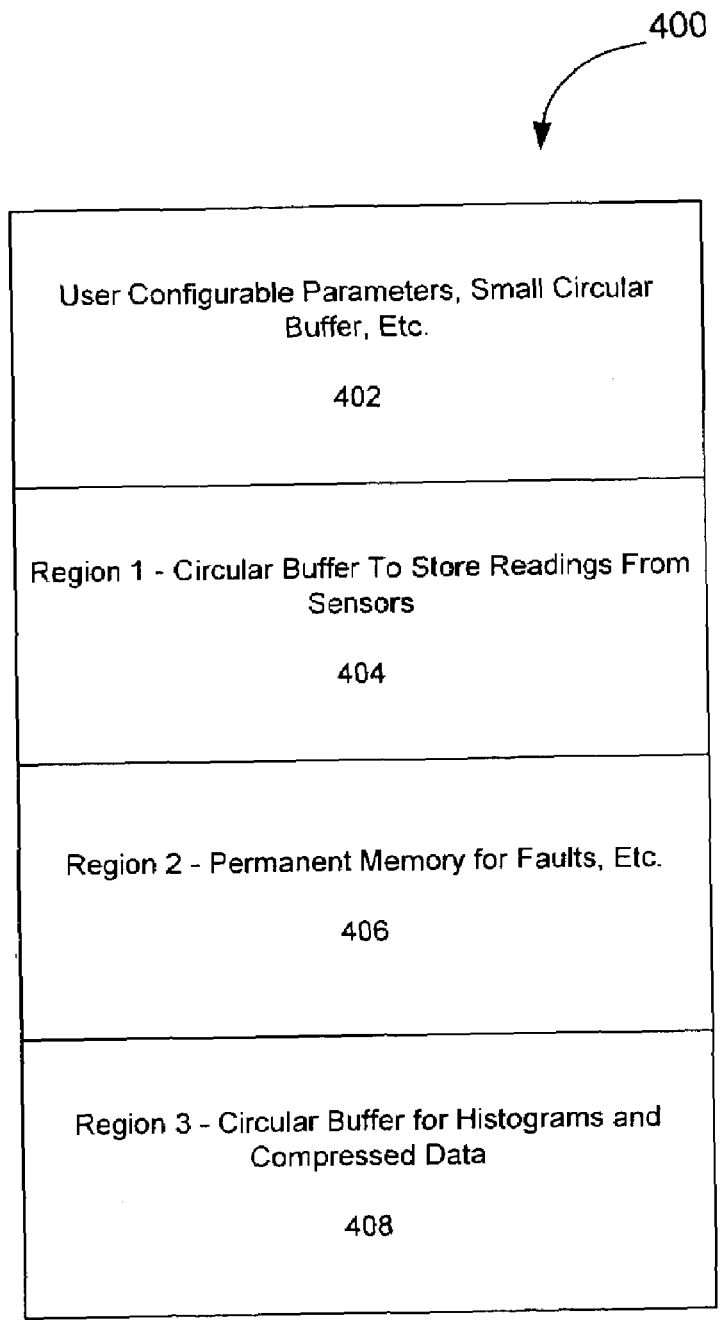
FIG. 4 is a schematic diagram of random access memory in the FIG. 2 system.

In another aspect of the illustrated apparatus, the software is designed for efficient use of memory and for permanent storage of events that are of interest to the device operator or manufacturer to provide convenient data logging. In this aspect, illustrated in FIG. 4, the on-board apparatus memory 400 is partitioned into various segments, or regions. A small portion 402 of the memory stores various configurable operating parameters, such as the data logging interval. The remainder of the memory is divided into three more regions.

An area 404 of the memory is referred to as "Region 1" and is used to store the sensor values, thereby providing the "data log", at various times during the apparatus operation. This data log memory area 404 is preferably configured as a circular buffer, such that during the storage of data, after the last memory address is reached, the next incoming data line is written to the first memory address. This memory storage operation is repeated for subsequent received data. Another portion 406 of memory called "Region 2" is reserved for system faults and other abnormal operating conditions. For example, data relating to excessive temperature, pressure, or frequency is stored in Region 2. This memory region is also a circular buffer, so that new values received after the memory is filled are stored on top of the first stored values, thereby overwriting the oldest data in the memory buffer. The last portion 408 of memory is called "Region 3", and is dedicated for storage of information that is derived from the data streaming through the microprocessor and is acted upon there, for example, histograms and portions of data which have been compressed. For efficient use of memory and speed of program execution, each region may be further divided into smaller sectors.

In another aspect of the illustrated embodiment, the data logging function of the microprocessor programming includes a feature called "adaptive data logging". With adaptive data logging, the sensor input is buffered for a selected period of time, such as for one or two minutes, as indicated by the real-time clock, and the input data is continuously analyzed over that time. If the temporal gradients of the sensor data input signals (or derived variables from the data signals) have not changed significantly over the time interval, then the sensor data values are not written to memory, thus allowing more hours or days of data to be stored in a fixed amount of memory. The magnitude of the change in the temporal gradients of the sensor inputs necessary to constitute a "significant" change to support data storage can be controlled by programming in the desired values. These values can be entered into the apparatus through a graphical or text-based user interface configuration setup function of the apparatus programming instructions.

Figure 5:
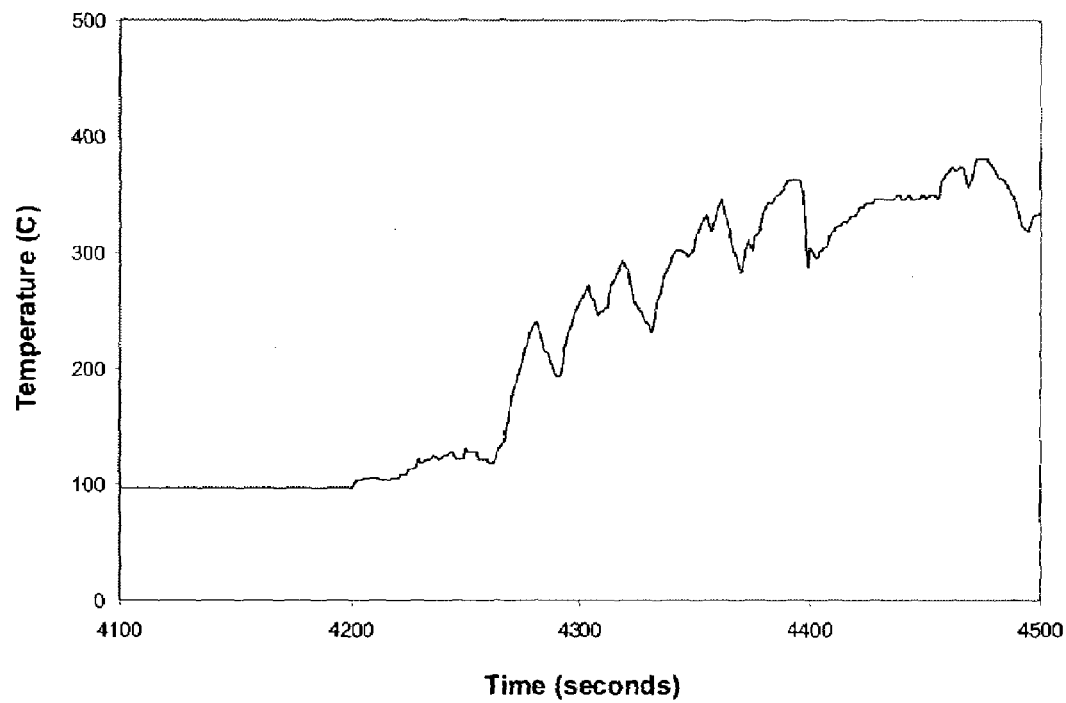
FIG. 5 is a chart that illustrates data collected in a system at the rate of one data recording interval for 400 seconds.
Figure 6:
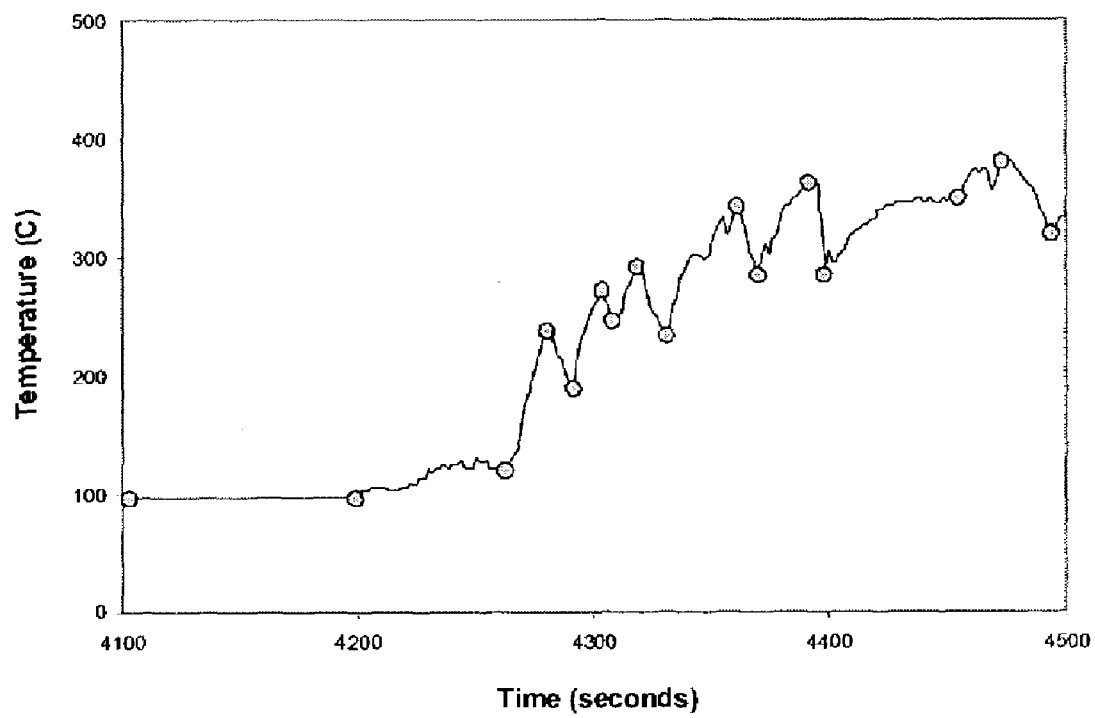
FIG. 6 is a chart that illustrates data collected by the FIG. 2 system in accordance with adaptive data logging in accordance with the invention.

The adaptive data logging is illustrated by comparing FIG. 5 and FIG. 6. FIG. 5 shows an example of a transient exhaust temperature history with a resolution of 1 Hz (i.e., a set of measurements each second) over a period of 400 seconds. It should be apparent that four hundred data points provide a highly accurate description of the exhaust temperature, but it should also be apparent that many of the points are extraneous, i.e., they do not provide any new information when compared to their neighbor data points. Programming that is resident in the microprocessor memory acts as a "gatekeeper" or "significance determiner" and can lead to significant reductions in the number of data points required to reconstitute the engine operating conditions. FIG. 6 shows the transient exhaust temperature history from FIG. 5, but with circles added at key data points. The circles in FIG. 6 show the result of an adaptive data logging algorithm which uses peaks and sudden changes in the temperature data as criteria for identifying data points of significance. In this example, the use of the sixteen points indicated by the circles in FIG. 6 will reasonably represent the key events of the time period from 4100 seconds to 4500 seconds, resulting in 95% memory savings.

In a typical operation, data logs from operating vehicles can be extremely voluminous. For example, a 0.2 Hz logging rate results in 17280 events per day. The programming of the illustrated embodiment provides a method to process the sensor values during the logging operation to avoid lengthy post-processing. The data processing module of the program continuously updates frequency distributions (histograms) for the variables (data signals) being logged. In the illustrated embodiment, the Region 3 area 408 of the memory contains a continuous histogram, which can be started when the user resets the histogram counters. Another area of the memory may temporarily store histograms that are written to the fixed areas of the memory periodically. Optionally, the histograms may be written at various predetermined time intervals, such as daily, weekly, or monthly, as desired. This approach has an additional advantage of making histograms from the original high resolution sensor signal data (for example at a data rate of 0.5 to 1 second per data interval), instead of making the histogram from data stored in the data logger (10-second to 30-second interval). Another advantage to this approach is that weekly histograms may remain in memory even after parts of the circular buffer have been overwritten.

The above-mentioned SRAM chip or chips of the apparatus memory can be used to improve the computational power of the microprocessor by acting as a data buffer during calculations. In accordance with this feature, the software is configured with program instructions to provide operational sequences for compression of the measured data using the on-board SRAM and microprocessor. One operational sequence method for achieving this would be as follows: uncompressed data are stored in a dedicated portion of the Region 3 area of the FLASH memory (FIG. 3). Periodically, the data are processed in accordance with a data compression technique to significantly reduce the memory requirements for storing the data. During the data compression process, the data will flow through the SRAM, and then back to a different area of the Region 3 of FLASH memory after compression.

The microprocessor can optionally be directly attached to the vehicle's controller area network (CAN). Those skilled in the art will understand that communicating with the vehicle's CAN permits the apparatus to obtain information about the engine's operating condition, such as engine speed, intake pressure, vehicle speed, and the like. Such access to the CAN is likely to reduce system costs by eliminating sensors. In some circumstances, the device will be able to direct the engine to operate in certain beneficial modes. For example, if a particulate filter becomes seriously plugged with soot and requires maintenance, the device can switch the engine into a low power mode to prevent damage to the filter or engine, while still permitting the vehicle to return to the service area. Suitable indicator lights will be illuminated (e.g., red LEDs).

In yet another aspect of the illustrated embodiment, the apparatus software may also include other variables which, for example, keep track of the time and occasions during which one or more sensor values has surpassed an established safe limit and log these events in the apparatus memory. For example, the software may include one or more set variables to determine when the inlet temperature of the system is above a certain set temperature, and to determine the time that the inlet temperature was at or above the set temperature. The results of these calculations may be stored in a special memory area to avoid overwriting of previously stored data. The overall operation of the apparatus is illustrated by the flow diagram of FIG. 7. The feature of storing operation data above safe limits is described further below in conjunction with the description of FIG. 8.

In yet another embodiment, the software can also be configured to count sharp increases or unexpectedly high or low values in one or more operating conditions. For example, the software can be configured to determine the number of instances and the extent of time during operation that the engine speed reached or exceeded a value that indicates out-of-ordinary operation during the operating period.

Figure 9A:
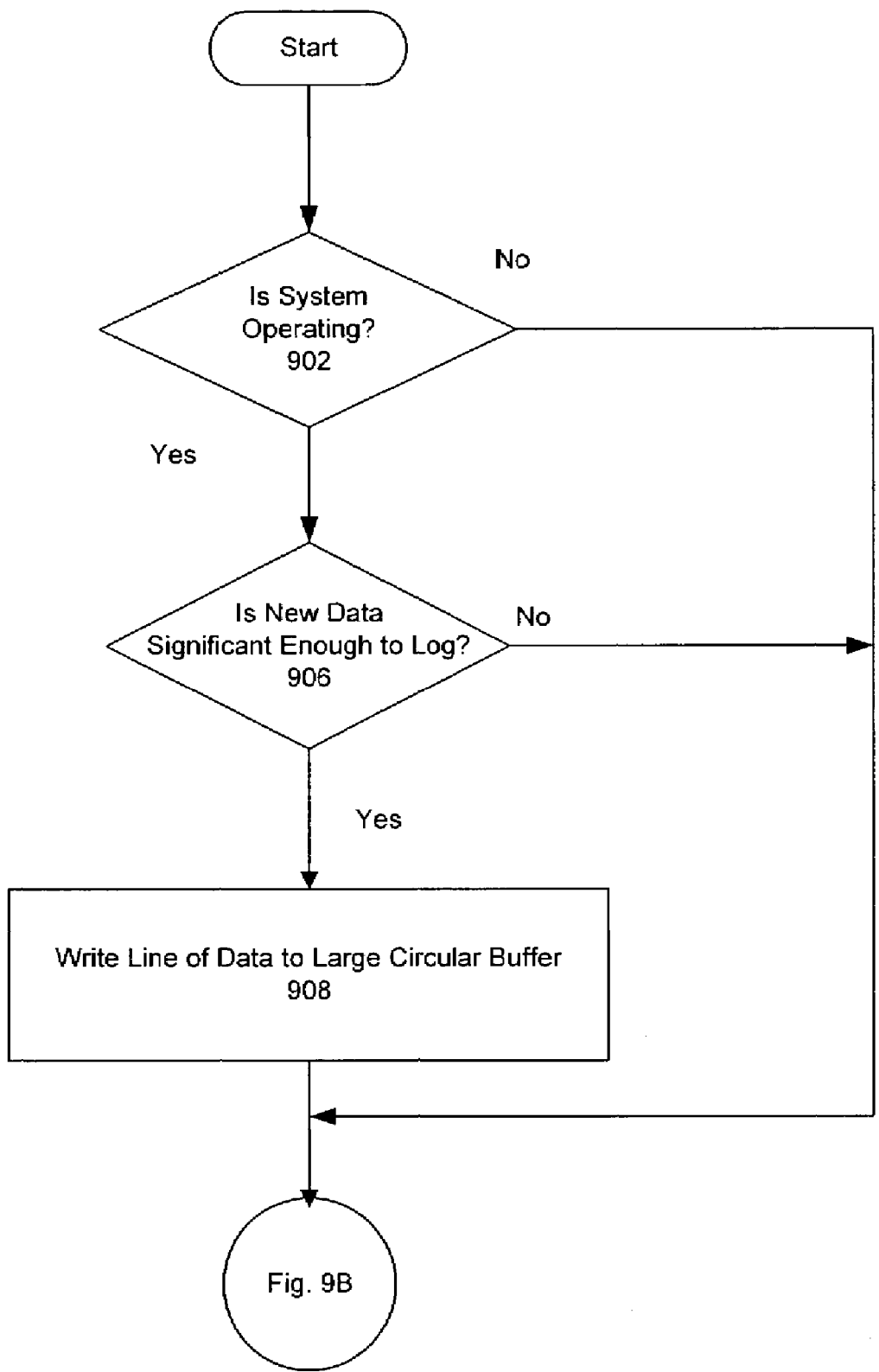
FIG. 9A and FIG. 9B together illustrate the data processing and logging operations of box 710 (FIG. 7).
Figure 9B:
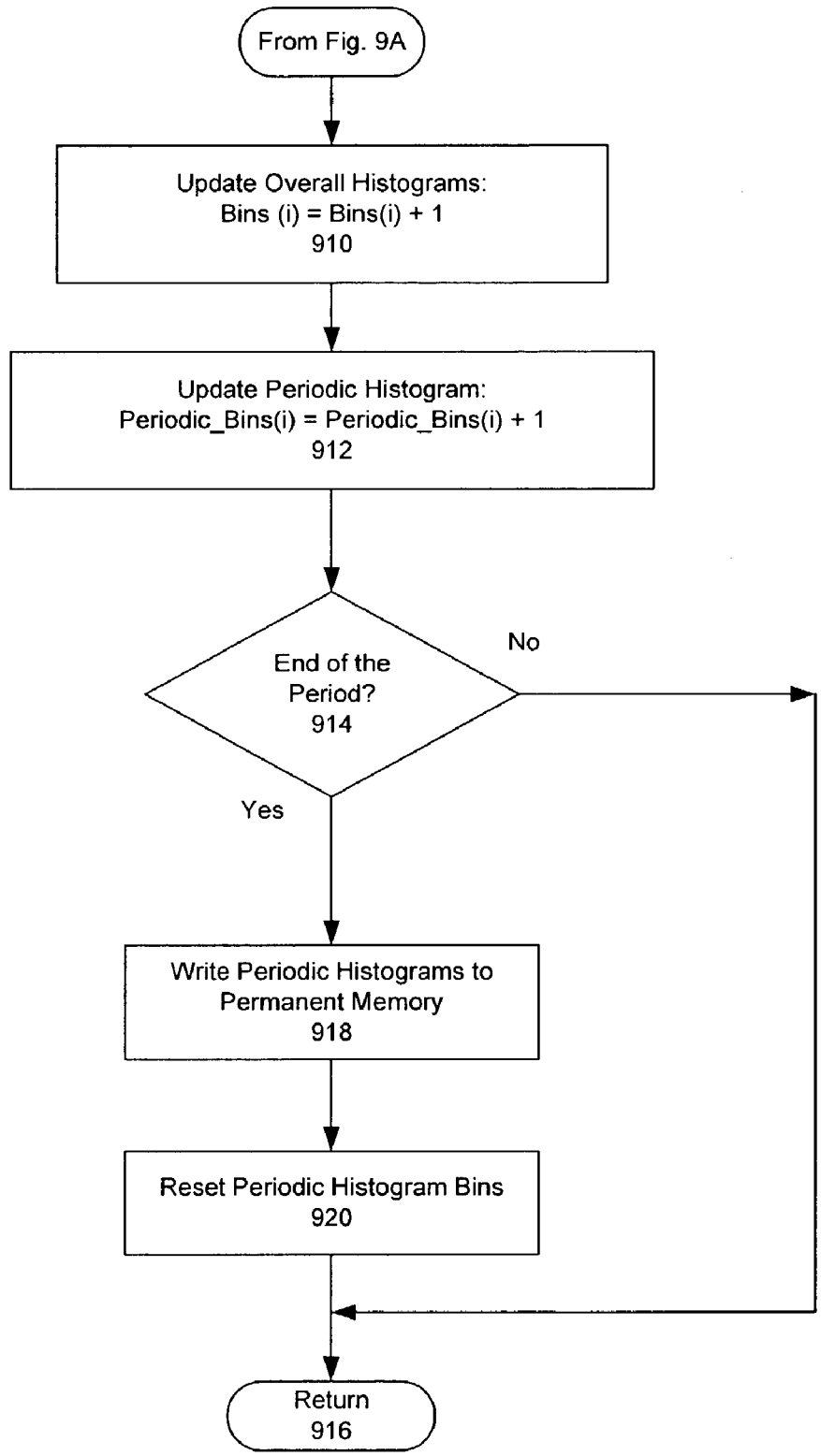

The software may be designed to identify various operating conditions that occurred outside of the normal operating range. Exemplary abnormal operating conditions include excessive exhaust back pressure. When such conditions occur, an error code may be written to a special region of the memory on the circuit board. Preferably, this area of memory is not a circular buffer that might be overwritten but is reserved, such that recorded faults can reside in the special region of memory for many months or years after initialization. An example algorithm is illustrated in FIG. 9A and FIG. 9B, and is described further below.

Figure 7:
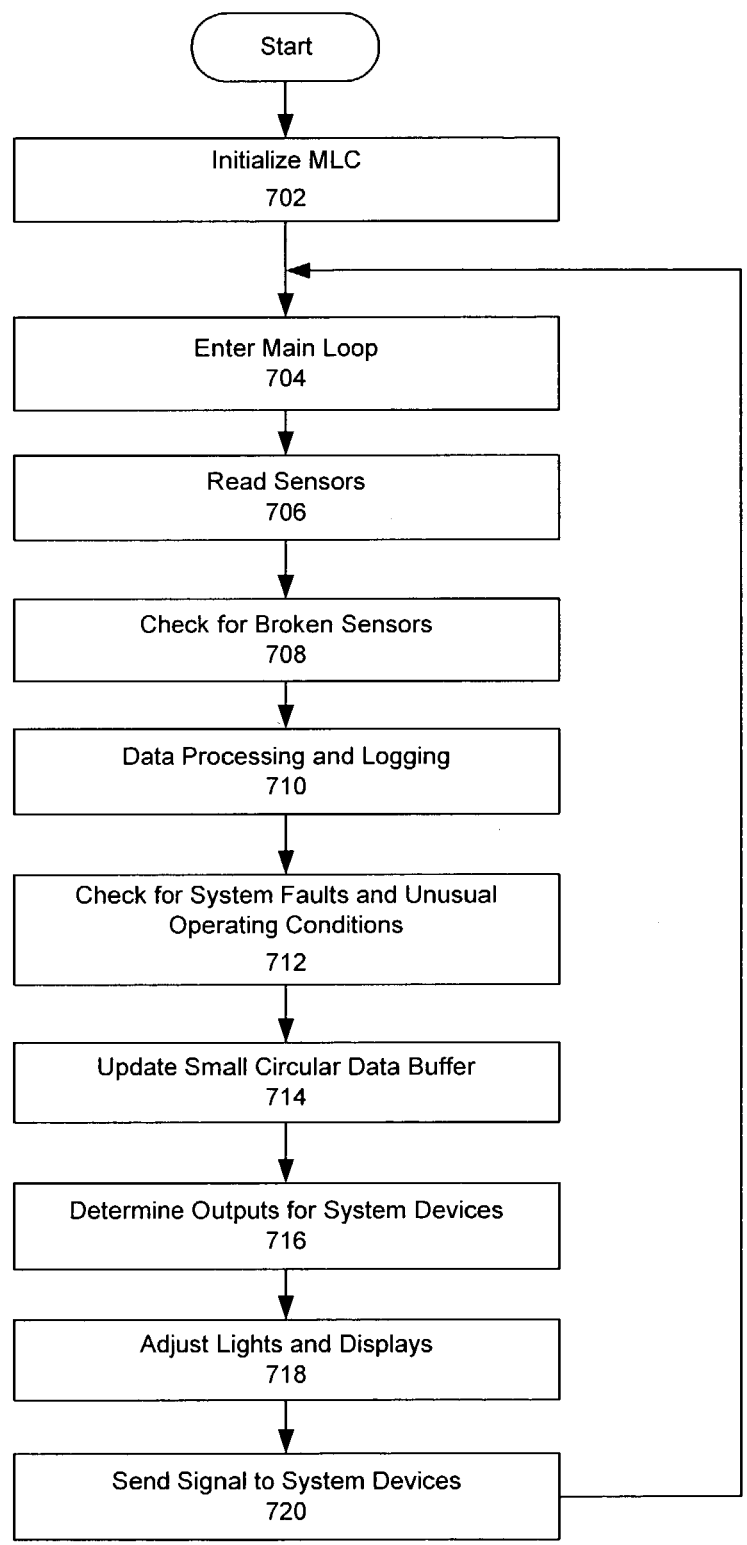
FIG. 7 is a flow diagram that illustrates the operational flow of the FIG. 2 system.

The software of the illustrated embodiment is written in a high level language suitable for use with microprocessors and microcontrollers, such as the ANSI "C" programming language, and is loaded onto the microprocessor through a PC interface (e.g., an Atmel "STK500" software configuration). FIG. 7 is a flow diagram that shows an exemplary operation sequence implemented by programming instructions executed by the microprocessor to provide an engine exhaust emission reduction system.

FIG. 7 shows that the first operation is an initialization sequence, indicated by the flow diagram box numbered 702. After initialization, a main loop is started (box 704) that continues until the apparatus power is disconnected. In each operation of the main loop, the operations illustrated within the loop will be performed. The first operation of the loop is for the microprocessor to read the sensors, as indicated at the box 706. The next operation is a check to determine if any sensors are malfunctioning (box 708). This operation is described in further detail below in connection with FIG. 8. The next operation is to process the sensor data and determine if the information should be logged to on-board memory (box 710); this operation is described further below in connection with FIGS. 9A and 9B. Next, as indicated by box 712, is a check for unusual operating conditions. This operation is further described below, in connection with FIG. 10. The next operation, at box 714, is to update a small circular data buffer (typically having a capacity of 5 to 10 minutes of 1 Hz data), followed by determining outputs for system components (e.g., valves, injectors, and the like), as indicated at box 716. The next operation (box 718) is to adjust user lights and displays (e.g., text screens, warning lamps). Lastly, at box 720, the microprocessor sends control signal(s) to the system components (e.g., move valve to new position, change injector duty cycle). These operations are continuously and repeatedly performed for as long as the apparatus is supplied with power.

Figure 8:
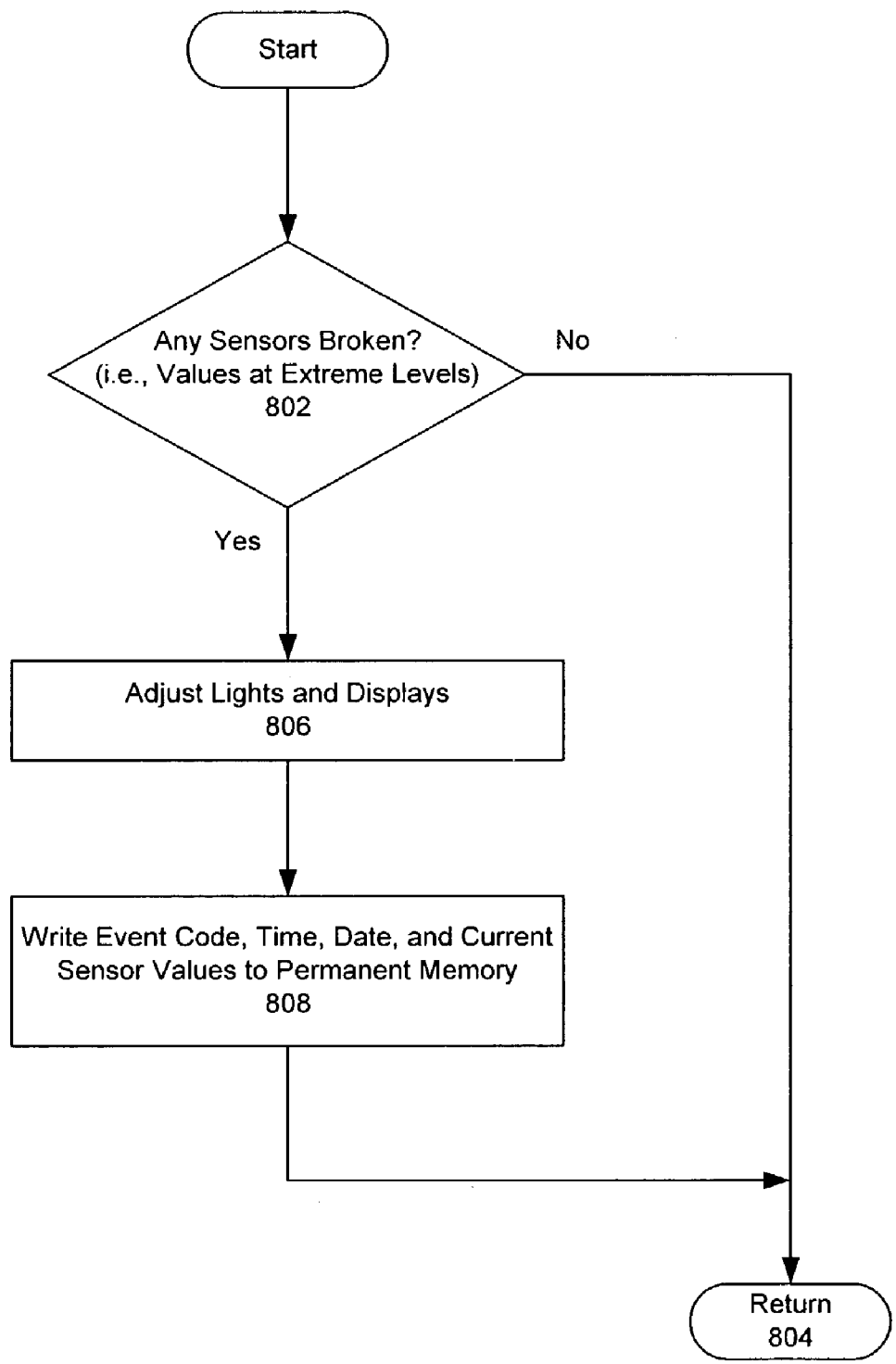
FIG. 8 is a flow diagram that illustrates processing to perform the FIG. 7 operation of checking for broken sensors (box 708).

FIG. 8 shows the broken sensor check processing of box 708 in further detail. The processing begins with a determination as to whether any sensors are malfunctioning by checking whether sensor values are at extreme values (far out of normal operating range). This is determined by comparing a sensor's current value to its expected value. For example, if a pressure sensor has expected outputs of between 1 and 4.5 V, then a reading of 0.5 V can be construed as a sensor failure. Similarly, a data signal of greater than 6.0 V can be construed as a sensor failure. Therefore, if the sensor data signal received by the microprocessor is not outside of the expected operational range of values, a negative outcome at the decision box 802, then the sensor is operating properly and operation returns to the main loop (box 804) for the next operation. If the data signal received from the sensor is out of the expected range of values, then at box 806 appropriate output indicators are produced, such as red LED lights and the like. At box 808, an event code, time of event, date, and current sensor values are written to a "permanent" storage area of the apparatus memory, as described above. Operation then returns to the main loop (box 804).

FIG. 9A and FIG. 9B together illustrate the data processing and logging operations of box 710 (FIG. 7). The FIGS. 9A, 9B processing determines whether the current data should be written to memory, and updates various histograms.

In the first operation, indicated by the decision box numbered 902, the microprocessor checks to determine if the system is operating. A non-operating condition will be defined in accordance with the characteristics of the underlying system for which monitoring, logging, and control are being performed. For example, a non-operating condition for the exhaust treatment apparatus illustrated in FIG. 2 would be indicated if the underlying internal combustion engine is not being operated or is not running at an engine speed greater than 100 RPM. If the engine is not operating, a negative outcome at the decision box 902, then the data logging operation proceeds to the FIG. 9B connector (described further below).

If the engine is operating, an affirmative outcome at box 902, then operation proceeds to the decision box 906, where the microprocessor determines if the new data is sufficiently significant to warrant logging the data into memory. The data logging decision, for the exhaust treatment apparatus, can be implemented either to record actual data values at regular predetermined intervals (such as every 5–30 secs.), or to record a time-average of data values at regular intervals, or to record local minima or maxima values, subject to a maximum data logging interval (such as every three minutes, when a forced data logging will occur regardless of local minima or maxima), or the data logging decision can be implemented so as to record data values only if the data value is significantly different from the previous data point (where the magnitude necessary to constitute "significantly different" will be set in accordance with the underlying system characteristics, as determined by those skilled in the art). If one of the data logging criteria is not satisfied, a negative outcome at the decision box 906, then operation proceeds to FIG. 9B (below). If the data logging criteria is satisfied, an affirmative outcome at the decision box 906, then operation proceeds to box 908, where the sensor data and any other accompanying data is written to the large circular buffer region of the apparatus memory. Processing then proceeds to FIG. 9B.

FIG. 9B processing begins with updating the overall histograms that are maintained by the microprocessor (box 910). As will be known by those skilled in the art, the histograms are updated by incrementing appropriate bin values by one, so that bin(i) is increased by one, where bin(i) is a bin that is indexed according to the data values. The tally of bin values are preferably maintained for all time since the last reset operation. A reset operation is preferably performed only by authorized service personnel and cannot be performed by engine operators who are not authorized service personnel. As noted above, this ensures data integrity. In the next operation, box 912, the periodic histogram bins are updated. The periodic histograms are histograms maintained only over a predetermined time interval before resetting. For example, periodic histograms might be maintained over a day, a week, a month, or other predetermined time period.

At the next operation, indicated by box 914, the microprocessor checks to determine if the end of the periodic histogram time interval has occurred. If the time period has not ended, a negative outcome at box 914, then operation returns to the main loop (box 916) in FIG. 7. If a periodic histogram interval has ended, an affirmative outcome at box 914, then the periodic histogram data is written to the "permanent" memory region (box 918). The appropriate periodic histogram bins (e.g. daily or weekly or monthly) are then reset (box 920). Processing then returns to the main loop at box 916 (return to FIG. 7, at box 712), for checking of system faults and the other operations of the main loop.

Figure 10:
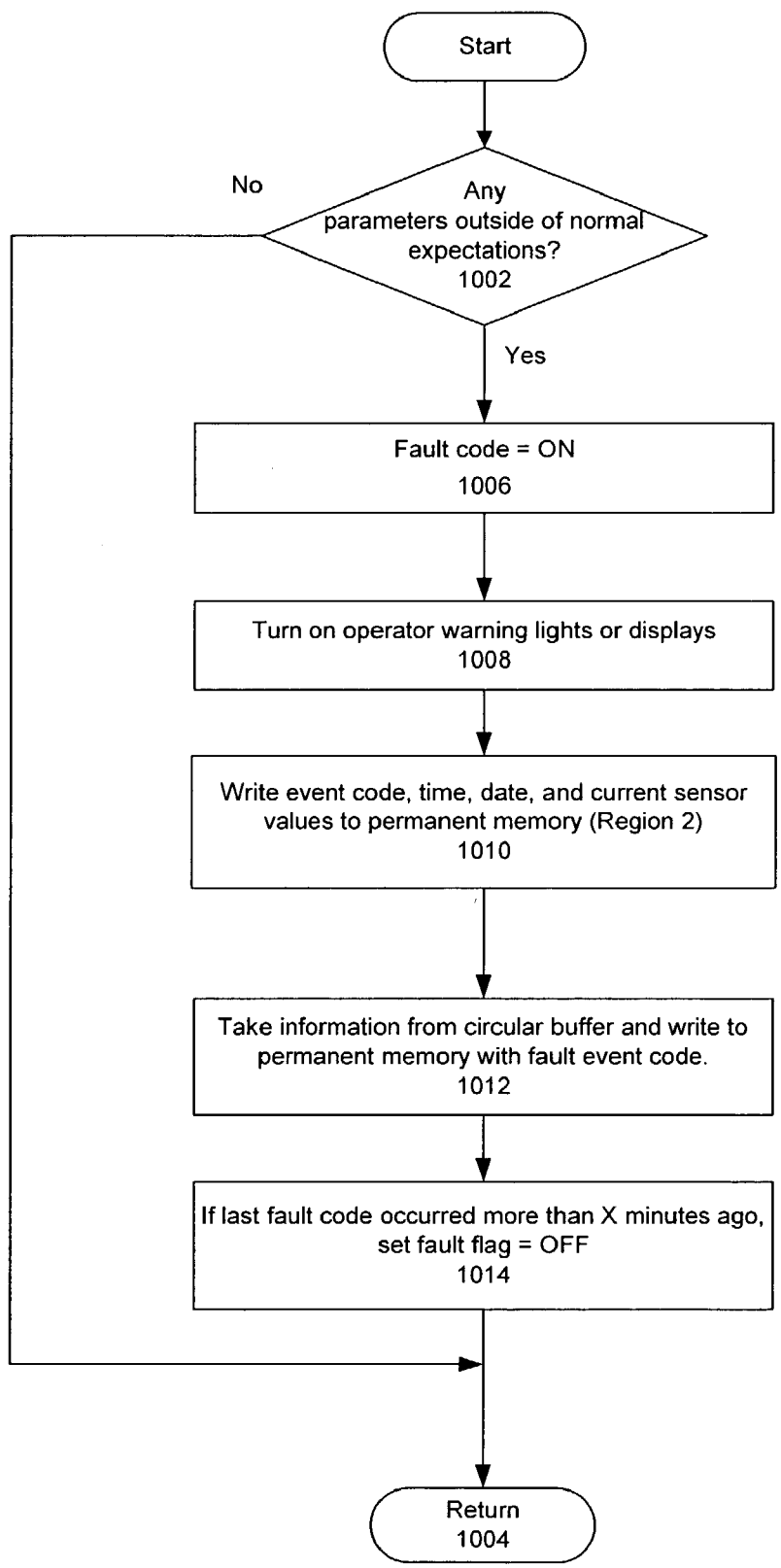
FIG. 10 is a flow diagram that illustrates processing to perform the FIG. 7 operation of checking for system faults and unusual operating conditions.

FIG. 10 illustrates the data processing operation of box 712 (FIG. 7) that determines if any abnormal conditions have occurred. For example, an excessively high catalyst inlet temperature or outlet temperature can be a result of a failed turbocharger bearing or other engine trouble. Such events can be valuable records for warranty claims.

In the first operation of FIG. 10, at box 1002, the microprocessor checks to determine if any sensor parameters are outside of normal expected sensor operating ranges. If the parameters are not unusual, a negative outcome at box 1002, then operation returns to the main loop (FIG. 7) at box 1004. If the sensor parameters are out of expected values, an affirmative outcome at box 1002, then a fault code variable is set to "ON" (box 1006). The microprocessor next generates a warning light or other suitable apparatus display, as indicated by box 1008. For example, the microprocessor might cause a red LED to blink or be illuminated steadily. Next, at box 1010, the microprocessor writes the event code for the condition, and the time, date, and current sensor value, into the "permanent" area of the apparatus memory (Region 2).

At box 1012, the microprocessor then reads information from the small circular buffer and writes it to permanent memory with the fault code. This operation places data relevant to the out of tolerance data into memory for later study and troubleshooting. For example, the microprocessor programming can initiate reading small buffer data for sensor values for the five minutes before the fault condition and for the five minutes after the fault condition. The time interval of five minutes before and after the fault comprises a fault window around the fault condition. Those skilled in the art will be able to set the conditions for retrieving the relevant data according to the underlying system for which monitoring, logging, and control are being performed.

At box 1014, the microprocessor checks to determine if the last fault that occurred was a recent event or was long ago. That is, if the last fault occurred more than a number of minutes "X" previously, then the fault flag is set to "OFF". The value of the "recent event" interval can be set according to those skilled in the art, depending on the underlying system. For example, for an internal combustion engine, the interval "X" is likely a value of five minutes or ten minutes. The operation of the system then returns to the main loop at box 1004.

The processing of the fault window feature described immediately above (box 1014 of FIG. 10) can be provided with additional features. The fault window feature is desirable because it is not practical to store the operating conditions of the equipment at all times, but it is possible to store key periods in time through use of the efficient fault window approach, wherein data around the time of the fault condition is stored, to allow one to know what occurred immediately before and immediately after the fault. To provide the fault window feature, the illustrated embodiment provides a circular buffer of predetermined size (preferably 15 minutes)

that receives operating conditions every time the sensors are queried (generally once per second). Upon noting a fault, a software flag (fault code) is set to ON. A portion of the data is then retrieved from the beginning of the buffer (i.e., the oldest data is retrieved) and stored in a fault code memory area at a lower data frequency, for example, at a thirty second data spacing. The data in the buffer which is closest to the fault for a predetermined time (for example, for the last five minutes) is written to the permanent memory with a greater data frequency to provide higher resolution (for example, at a frequency of one data recording per second). This approach allows the conditions before and after the fault to be recorded for later retrieval without requiring endless amounts of memory.

The circular buffer can store data using a constant time interval, so that data is stored at regular intervals of system operating time. Optionally, however, the circular buffer can be filled to have a sparse data loading at the beginning of the buffer, and a high resolution log at the end. This allows the contents from the circular buffer to be written to the non-circular memory without filtering to reduce the data set. In accordance with this processing, if a fault code is received by the microprocessor while the fault flag is set to ON, the temporal resolutions required by each received fault code are compared, and the highest resolution required by a received fault code is used.

Figure 11:
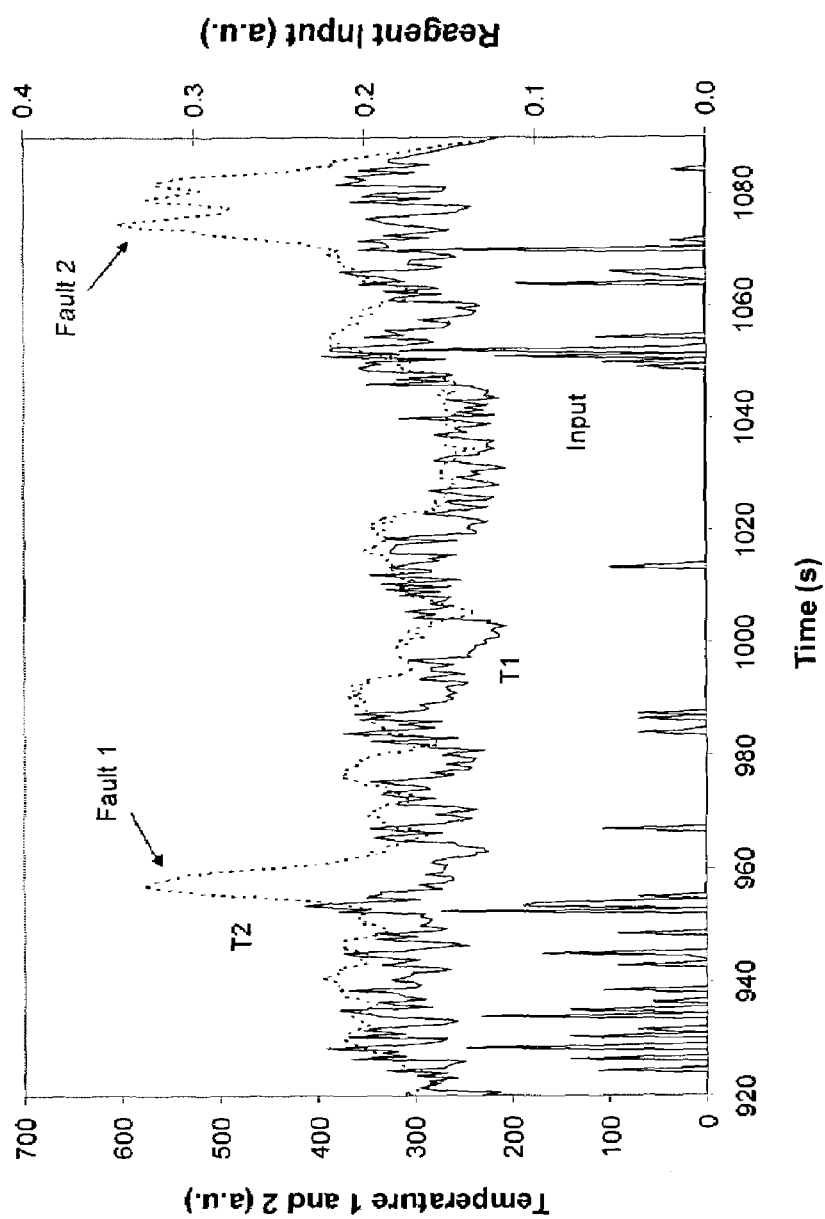
FIGS. 11, 12, and 13 show data illustrating an example of the fault window feature that shows the real time data (FIG. 11) and the fault window recorded data points for a first fault condition (FIG. 12) and a second fault condition (FIG. 13).
Figure 12:
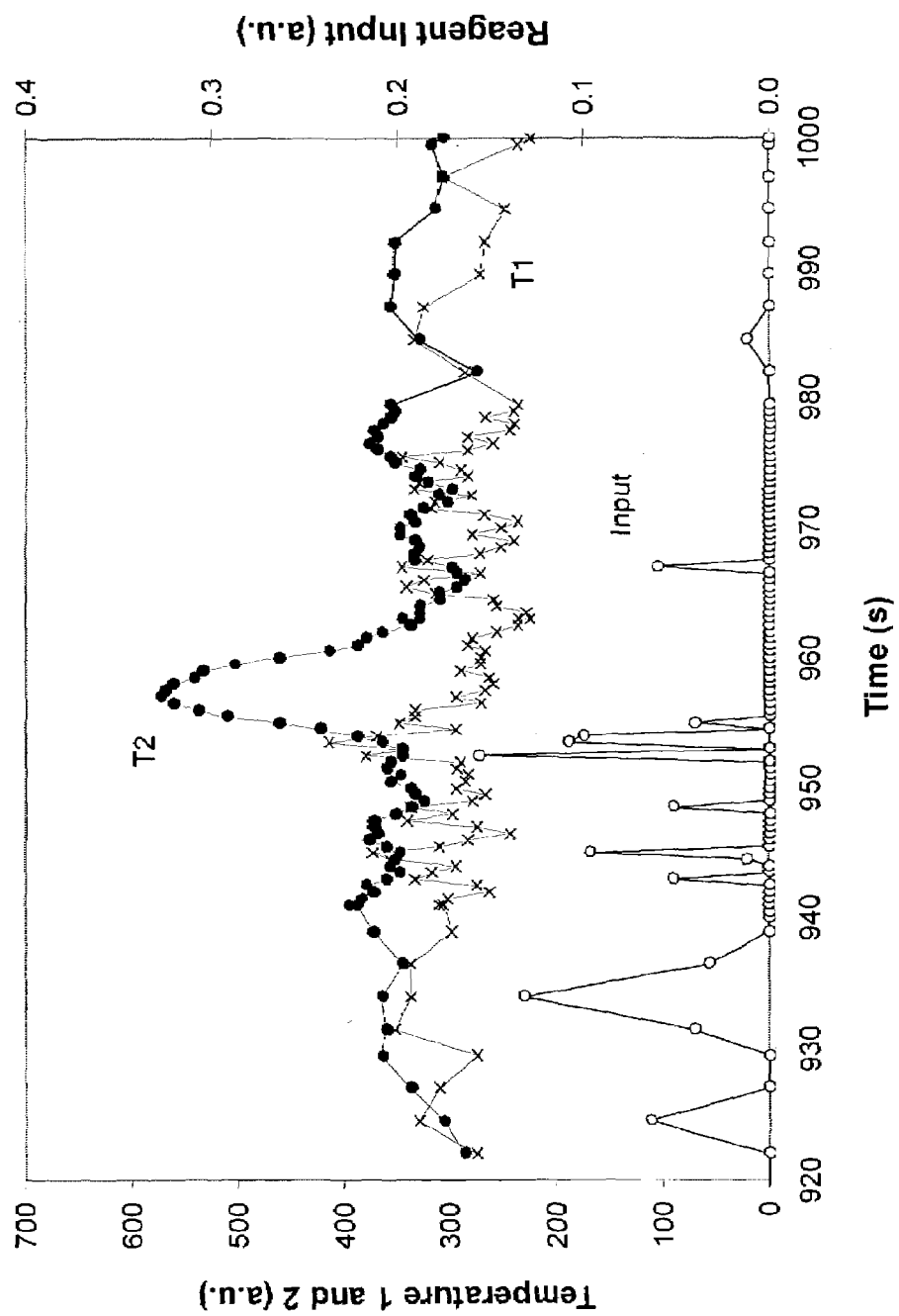
Figure 13:
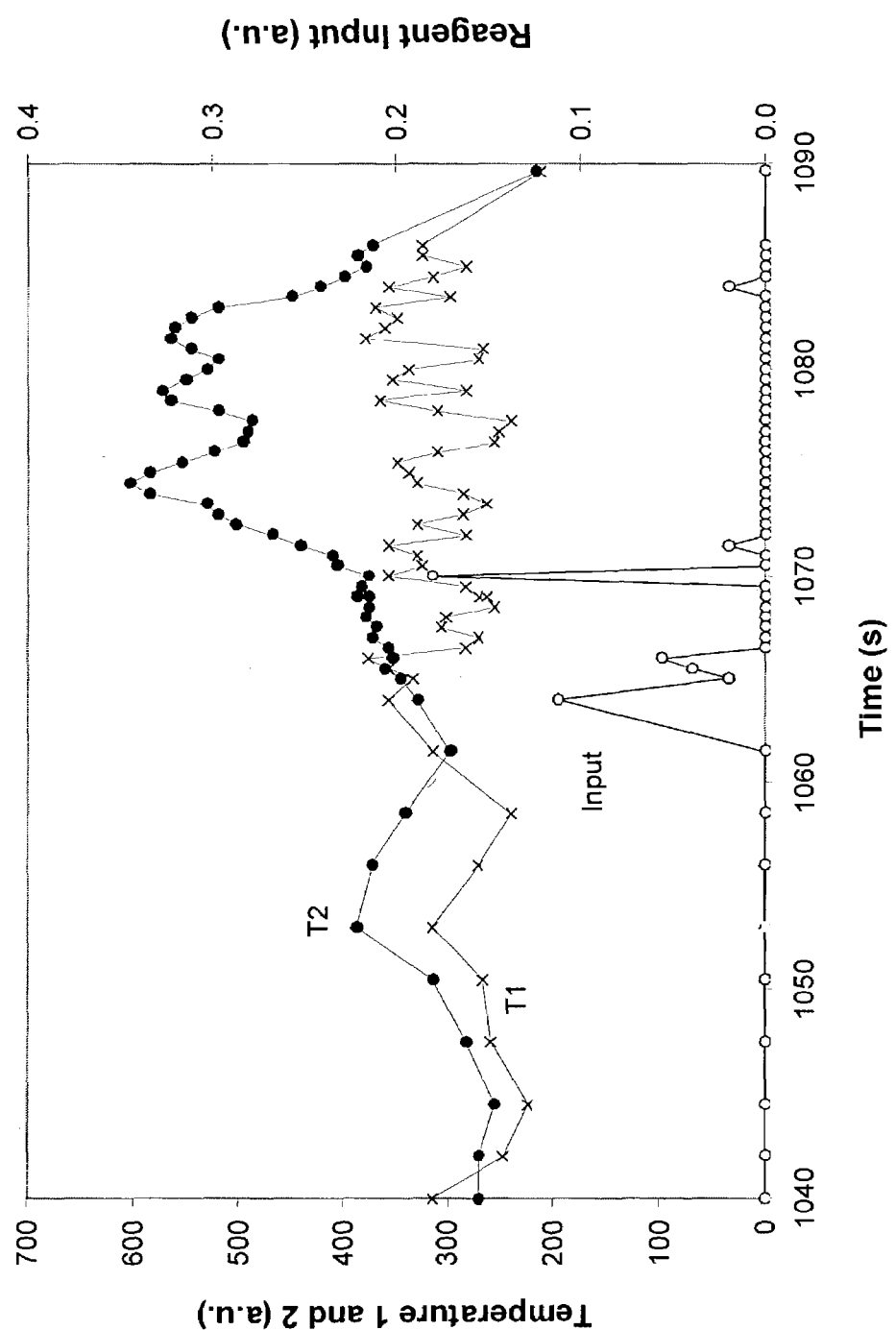

FIGS. 11, 12, and 13 show an example of the fault window feature for a catalytic reactor with an inlet at temperature T1, a reagent injector, a catalytic bed, and an outlet at temperature T2. As the working fluid passes through the catalytic bed, thermal filtering and delay occurs, thus affecting the outlet temperature (T2). Supplemental reagent is injected at times commanded by the apparatus microprocessor, thus causing the outlet temperature T2 to exceed the inlet temperature T1 (allowing for time-delay and filtering). For this example, a fault occurs when either the first data signal (T1) or the second data signal (T2) exceeds 550° C.

FIG. 11 shows sensor data with high resolution data logging for approximately one hundred seventy seconds of system operation, with data signals in arbitrary units for purposes of illustration. The data for the reagent injection is indicated by the solid graph line at the bottom of FIG. 11, near the x-axis, with its values on the right y-axis. The sensor data for the inlet temperature T1 is indicated by the solid graph line that is generally in the middle of the FIG. 11 graph. The sensor data for the outlet temperature T2 is indicated by the dotted line. FIG. 11 shows the occurrence of two fault conditions, the first fault period at about 960 seconds (identified in the graph as Fault 1) and the second fault period at about 1065 seconds (identified as Fault 2). In accordance with the FIG. 10 operation, operational data relating to each of these faults conditions will be recorded using a fault window operation.

FIG. 12 shows the data recording of the fault window for the first fault. For the period of forty seconds before the fault condition (at approximately 920 seconds on the FIG. 12 graph) through twenty seconds before the fault (at about 940 seconds), data are logged at 3-second intervals. For the period from about twenty seconds before the fault (940 seconds) through about twenty seconds after the fault (980 seconds), data are logged at 0.5 second intervals, a greater data resolution. Thus, the data for the time period closest to the occurrence of the fault condition is recorded with a higher resolution (time frequency) and data for any other time period has a lower resolution, having less detail. The differential data recording can be observed by noting the spacing of the permanent-memory-recorded graph data points (dots, crosses, and circles) in FIG. 12, which are spaced farther apart from 920 seconds to 940 seconds, are spaced more closely from 940 seconds to about 980 seconds, and then again are spaced farther apart from 980 seconds and beyond.

FIG. 13 shows a similar data characteristic for the second fault that occurs at approximately 1065 seconds. The data points that are recorded in the permanent memory are spaced farther apart from 1045 seconds to approximately 1065 seconds, when the fault occurs. From 1065 seconds to approximately 1085 seconds, the data is recorded into the permanent memory at a higher data recording frequency, and from 1085 seconds and later the data is once again recorded at a reduced frequency. Thus, data recording is conducted at a high frequency only for periods of greatest interest, thereby conserving the data memory resource and providing more effective recording time.

The fault window operation of the apparatus described above can provide efficient recording of unusual conditions or faulty operation with differential recording intervals that involves periodically updating operating conditions in a circular buffer, recording operating conditions to a non-circular buffer when a fault has occurred by using a long data logging interval (low resolution) during the period in the circular buffer from the most distant point to a predetermined point in time (e.g., 15 minutes previous to 10 minutes previous), with a short data logging interval (high resolution) during the period closer to occurrence of the fault condition (e.g., 10 minutes previous until the occurrence of the fault condition). The fault window recording sets a fault flag that initiates the recording of system operation data to a non-circular buffer with a high temporal resolution until a predetermined period has elapsed and then, after the predetermined period has elapsed, the apparatus records data to a non-circular buffer using a low temporal resolution until another predetermined interval has passed.

The fault window recording of the apparatus is implemented by the apparatus microprocessor such that the sensor data is stored in a circular buffer memory and, upon detecting a fault condition, a first portion of the sensor data in the circular buffer is stored to a non-circular buffer according to a high resolution data storing frequency for a predetermined high resolution time interval that extends immediately before and immediately after the occurrence of the fault condition. A second portion of the sensor data in the circular buffer is stored to the non-circular buffer according to a low resolution data storing frequency, for a predetermined time interval outside of the high resolution time interval. The low resolution data storing frequency can be an apparatus default data storing rate, which can be set by the user.

In this way, the fault window recording operation of the apparatus increases the efficiency of data recording by the apparatus. The fault window recording can greatly extend the amount of operation time over which the apparatus can record useful system operational data.

Thus, the apparatus described above permits simultaneous monitoring, logging, and control of an industrial process. The industrial process can comprise, for example, a chemical plant, or steam generation plant, or heavy machinery, or the like. The system described above provides an apparatus that is fitted to an exhaust gas treatment system where the underlying system is an internal combustion engine, such as a diesel engine. Other features can be provided with the apparatus, depending on the operating characteristics and needs of the system for which monitoring, logging, and control will be performed. For example, the apparatus can use Global Positioning Satellite (GPS) information to determine apparatus geographic location, such as which air basin or air quality management district the vehicle is operating within, and therefore to allow air regulators to provide credit as needed. Other features can be added to the apparatus without departing from the teachings described thus far. For example, wireless transmission of data can be provided by the apparatus. This is especially beneficial for mobile equipment that is generally moved around to various operational locations, but which periodically returns to a headquarters location or depot periodically. For such situations, wireless transmission of the state of the equipment can improve reliability and alert maintenance staff to problems.

To provide the wireless data transmission capability, the apparatus can have a wireless transmitter/receiver that uses transmission protocols known in the art (e.g., Bluetooth, or IEEE 802.11b data standards) to send and receive information from a central station or hub. A data receiver is placed in the headquarters location or depot. For the vehicle internal combustion engine example described above, when a vehicle equipped with the apparatus enters the depot, the apparatus microprocessor initiates transmission of the fault log (if any) to the central computer of the depot. Periodically, the vehicle may optionally transmit the entire datalog from the device memory to the central computer. A suitable wireless transmission configuration can be provided, for example, using the "R:COM" product from ThermoKing Corporation of Minneapolis, Minn., USA. Information about Thermoking Corporation can be found at the Internet URL of www.thermoking.com and information regarding the "R:COM" product can be found at the URL of www.thermoking.com/thermoking/products/r_com.asp.

The apparatus described herein simultaneously monitors a process, logs the condition of the process, and controls devices that affect the process. The combination of monitor, logger, and controller in a single self-contained package, the adaptive time interval in data logging operations, the running histograms, and data analysis described above provide features and efficiencies that were not previously available.

The apparatus is programmable and can execute programming instructions written or specified by the user. The user can change all key parameters and transfer those to the device memory for implementation. The programmable feature allows the operator to modify the software to address any application. Additional parameters can be changed through a user interface without reprogramming the microprocessor. In this way, the apparatus accommodates functional upgrading and downgrading through software changes.

The present invention has been described above in terms of a presently preferred embodiment so that an understanding of the present invention can be conveyed. There are, however, many configurations for the system and application not specifically described herein but with which the present invention is applicable. The present invention should therefore not be seen as limited to the particular embodiments described herein, but rather, it should be understood that the present invention has wide applicability with respect to industrial process systems generally. All modifications, variations, or equivalent arrangements and implementations that are within the scope of the attached claims should therefore be considered within the scope of the invention.

We claim:

1. An apparatus that performs monitoring, logging, and controlling in connection with a system, the apparatus comprising:
    at least one system sensor that produces sensor data corresponding to a system characteristic detected by the sensor;
    memory that stores data and program instructions;
    at least one output port that provides an output signal of the apparatus; and
    a microprocessor that receives the sensor data and executes the program instructions to monitor and adaptively log the sensor data received from the system sensor and to provide control data to the output port that thereby controls a device affecting the system, wherein the microprocessor performs the adaptive data logging with a differential recording scheme in which the sensor data is stored in a first memory and, upon the microprocessor detecting a fault condition, a first portion of the sensor data in the first memory is stored to a second memory according to a high resolution data storing frequency for a predetermined high resolution time interval that extends immediately before and immediately after the occurrence of the fault condition, and a second portion of the sensor data in the first memory is stored to the second memory according to a low resolution data storing frequency for a predetermined time interval outside of the high resolution time interval.

2. An apparatus as defined in claim 1, wherein the first memory is a circular buffer.

3. An apparatus as defined in claim 1, wherein the second memory is a non-circular buffer.

4. A method of operating an apparatus for data monitoring, logging, and controlling, the method comprising:
    receiving sensor data in real time from at least one system sensor that produces the sensor data corresponding to a system characteristic detected by the sensor
    monitoring the sensor data to detect sensor data values that exceed limit values for normal operation;
    adaptively logging the sensor data in apparatus memory; and
    producing control data that controls a device that affects the system, wherein the sensor data is stored into the apparatus memory in accordance with a differential recording scheme in which the sensor data is stored in a first memory and, upon detecting a fault condition, a first portion of the sensor data in the first memory is stored to a second memory according to a high resolution data storing frequency for a predetermined high resolution time interval that extends immediately before and immediately after the occurrence of the fault condition, and a second portion of the sensor data in the first memory is stored to the second memory according to a low resolution data storing frequency for a predetermined time interval outside of the high resolution time interval.

5. A method as defined in claim 4, wherein the first memory is a circular buffer.

6. A method as defined in claim 4, wherein the second memory is a non-circular buffer.

7. An apparatus that performs monitoring, logging, and controlling in connection with a system, the apparatus comprising:
    at least one system sensor that produces sensor data corresponding to a system characteristic detected by the sensor;
    at least one output port that provides an output signal of the apparatus; and
    means for storing data and program instructions that stores the sensor data in a first memory to provide a running log of the data and includes a reserved memory region that stores system fault data, and for monitoring and adaptively logging the sensor data and to provide control data to the output port and thereby controlling a device affecting the system, wherein the apparatus adaptively stores the sensor data such that the sensor data is stored in the first memory and, upon detecting a fault condition, a first portion of the sensor data in the first memory is stored to a second memory according to a high resolution data storing frequency for a predetermined high resolution time interval that extends immediately before and immediately after the occurrence of the fault condition, and a second portion of the sensor data in the first memory is stored to the second memory according to a low resolution data storing frequency for a predetermined time interval outside of the high resolution time interval.

8. An apparatus as defined in claim 7, wherein the first memory is a circular buffer.

9. An apparatus as defined in claim 7, wherein the second memory is a non-circular buffer.

10. An apparatus that processes sensor data for monitoring and logging in connection with a system, the apparatus comprising:
at least one system sensor that produces sensor data corresponding to a system characteristic detected by the sensor;
memory that stores data and program instructions;
at least one output port that provides an output signal of the apparatus; and
a microprocessor that receives the sensor data and executes the program instructions to monitor and log the sensor data received from the system sensor, such that the sensor data is stored in the memory in accordance with a differential recording scheme in which the sensor data is stored in a first memory and, upon the microprocessor detecting a fault condition, a first portion of the sensor data in the first memory is stored to a second memory according to a high resolution data storing frequency for a predetermined high resolution time interval that extends immediately before and immediately after the occurrence of the fault condition, and a second portion of the sensor data in the first memory is stored to the second memory according to a low resolution data storing frequency for a predetermined time interval outside of the high resolution time interval.

11. An apparatus as defined in claim 10, wherein the microprocessor analyzes the sensor data and produces a collection of histogram data in real time for a range of values indicated by the sensor data and stores the histogram data in the memory.

12. An apparatus as defined in claim 11, wherein the microprocessor collects the histogram data starting with a system initialization time and continuing until a histogram reset time.

13. An apparatus as defined in claim 11, wherein the microprocessor collects the histogram data over a predetermined time interval and then begins a new collection of histogram data.

14. An apparatus as defined in claim 10, wherein the system comprises an engine exhaust treatment system, wherein the apparatus includes system sensors comprising at least one of exhaust gas temperature or exhaust gas pressure, and the output signal comprises an apparatus status indication.

15. An apparatus as defined in claim 10, wherein the microprocessor performs data compression of the sensor data stored in the memory.

16. An apparatus as defined in claim 10, wherein the first memory is a circular buffer.

17. An apparatus as defined in claim 10, wherein the second memory is a non-circular buffer.

* * * * *